(12) United States Patent
Osborne et al.

(10) Patent No.: US 12,458,652 B2
(45) Date of Patent: *Nov. 4, 2025

(54) PHARMACEUTICAL COMPOSITIONS OF SPIRONOLACTONE FOR DEEP DERMAL DRUG DELIVERY

(71) Applicant: ARCUTIS BIOTHERAPEUTICS, INC., Westlake Village, CA (US)

(72) Inventors: David W. Osborne, Fort Collins, CO (US); Babak N. Tofig, Westlake Village, CA (US)

(73) Assignee: ARCUTIS BIOTHERAPEUTICS, INC., Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,405

(22) Filed: Nov. 10, 2022

(65) Prior Publication Data

US 2023/0143609 A1 May 11, 2023

Related U.S. Application Data

(60) Provisional application No. 63/278,377, filed on Nov. 11, 2021.

(51) Int. Cl.
*A61K 31/585* (2006.01)
*A61K 9/00* (2006.01)
*A61K 9/107* (2006.01)
*A61K 9/12* (2006.01)
(Continued)

(52) U.S. Cl.
CPC .......... *A61K 31/585* (2013.01); *A61K 9/0014* (2013.01); *A61K 9/009* (2013.01); *A61K 9/107* (2013.01); *A61K 9/122* (2013.01); *A61K 47/20* (2013.01); *A61K 47/38* (2013.01)

(58) Field of Classification Search
None
See application file for complete search history.

(56) References Cited

U.S. PATENT DOCUMENTS

| 8,003,690 | B2 * | 8/2011 | Vergnault | A61K 9/06 514/462 |
| 9,114,077 | B2 | 8/2015 | Petersen | |
| 9,422,300 | B2 | 8/2016 | Sun et al. | |

(Continued)

FOREIGN PATENT DOCUMENTS

| CN | 111278466 A | 6/2020 |
| EP | 0479777 A1 | 4/1992 |

(Continued)

OTHER PUBLICATIONS

Ferreira-Nunes et al. Follicular-targeted delivery of spironolactone provided by polymeric nanoparticles. Colloids and Surfaces B: Biointerfaces. Sep. 2021. 208:112101 (Year: 2021).*

(Continued)

*Primary Examiner* — Jeffrey S Lundgren
*Assistant Examiner* — Anthony Joseph Seitz
(74) *Attorney, Agent, or Firm* — Rothwell, Figg, Ernst & Manbeck, P.C.

(57) ABSTRACT

Pharmaceutical compositions for the topical administration of spironolactone to the pilosebaceous unit and methods for administering the same. The pharmaceutical compositions comprise aqueous suspensions of submicron particles of spironolactone in water.

13 Claims, 7 Drawing Sheets

(51) Int. Cl.
*A61K 47/20* (2006.01)
*A61K 47/38* (2006.01)

(56) References Cited

U.S. PATENT DOCUMENTS

| | | | |
|---|---|---|---|
| 9,527,851 | B2 | 12/2016 | Zhang et al. |
| 9,636,353 | B2 | 5/2017 | Mittal et al. |
| 9,713,590 | B2 | 7/2017 | Mittal et al. |
| 9,757,394 | B2 * | 9/2017 | Pipho ............... A61K 47/02 |
| 10,023,577 | B2 | 7/2018 | Sun et al. |
| 10,150,770 | B2 | 12/2018 | Sun et al. |
| 10,428,074 | B2 | 10/2019 | Zhang et al. |
| 10,786,507 | B2 | 9/2020 | Lu et al. |
| 2006/0159638 | A1 | 7/2006 | Segura et al. |
| 2013/0072512 | A1 | 3/2013 | Jahagirdar et al. |
| 2016/0279152 | A1 | 9/2016 | Chen et al. |
| 2016/0361381 | A1 | 12/2016 | Green et al. |
| 2017/0020896 | A1 * | 1/2017 | Kelidari ............... A61K 31/585 |
| 2017/0044171 | A1 | 2/2017 | Zhang et al. |
| 2019/0060311 | A1 | 2/2019 | Shanler et al. |
| 2020/0276109 | A1 | 9/2020 | Xi et al. |

FOREIGN PATENT DOCUMENTS

| | | | |
|---|---|---|---|
| EP | 3714887 | A1 | 9/2020 |
| WO | 9011077 | A1 | 10/1990 |
| WO | 2019040706 | A1 | 2/2019 |
| WO | 2019236596 | A1 | 12/2019 |
| WO | 2022/108913 | A1 | 5/2022 |

OTHER PUBLICATIONS

Noaimi et al. Treatment of Acne Vulgaris by Topical Spironolactone Solution Compared With Clindamycin Solution. Aug. 31, 2021. Cureus. 13(8): e17606 (Year: 2021).*

Noaimi et al. (Cureus. 13(8): e17606 (Aug. 31, 2021) (Year: 2021).*

International Search Report and the Written Opinion of the International Searching Authority, issued in corresponding International Application No. PCT/US2021/059487, dated Mar. 4, 2022, 14 pages.

International Search Report and the Written Opinion of the International Searching Authority, issued in corresponding International Application No. PCT/US2021/059479, dated Mar. 11, 2022, 18 pages.

MinoxidilMax, "Topical Spironolactone 5% for Hair Loss, Acne," printed on Feb. 22, 2022, X055894342, retrieved from the Internet: https://www.minoxidilmax.com/topical-spironolactone, 6 pages.

Leite-Silva et al. "The Influence of Emollients on Dermal and Transdermal Drug Delivery" In Percutaneous Penetration Ehancers Drug penetration Into/Through the Skin Methodology and General Considerations, May 4, 2017 (May 4, 2017), Springer-Verlag Berlin Heidelberg, XP055889873, pp. 77-93.

"Cyclomethicone/Dimethicone," Handbook of Pharmaceutical Excipients, Fifth Edition, Jan. 1, 2006 (Jan. 1, 2006), Pharmaceutical Press, XP055889869, 6 pages.

Wu Ke et al., "Quality Assessment of API in Semisolid Topical Drug Products," The Role of Microstructure in Topical Drug Product Development, Aug. 7, 2019 (Aug. 7, 2019), Springer International Publishing, XP055895570, p. 113.

Annika Vogt et al., "Follicular Targeting—A Promising Tool in Selective Dermatotherapy," JID Symposium Proceedings, (2005), 10(3):252-255.

D. W. Osborne et al., "The Influence of Skin Surface Lipids on Topical Formulations," Marcel Dekker, New York (1990), pp. 69-86.

Andrea C. Lauer et al., "Transfollicular Drug Delivery", Pharmaceutical Research, (1995), 12(2):179-186.

Amit Verma et al., "Transfollicular drug delivery: current perspectives," Research and Reports in Transdermal Drug Delivery, (2016), 5:1-17.

Attwa et al., "Efficacy and safety of topical spironolactone 5% gel versus placebo in the treatment of acne vulgaris," Egyptian J. Dermatol. Venerol., (2019), 39:89-94.

J.W. Charny et al., "Spironolactone for the treatment of acne in women, a retrospective study of 110 patients," Int. J. Womens Dermatol., (2017), 3(2): 111-115.

Harvey et al., MALDI-MSI for the Analysis of a 3D Tissue-Engineered Psoriatic Skin Model, Proteomics 2016 (2016), 16, 1718-1725.

International Search Report and the Written Opinion of the International Searching Authority, issued in corresponding International Application No. PCT/US2022/049545, dated Mar. 6, 2023, 13 pages.

* cited by examiner

PHARMACEUTICAL COMPOSITIONS OF SPIRONOLACTONE FOR DEEP DERMAL DRUG DELIVERY

CROSS REFERENCE TO RELATED APPLICATION

The present application claims priority to U.S. Provisional Application No. 63/278,377 filed on Nov. 11, 2021, which is incorporated by reference herein.

FIELD OF THE INVENTION

The subject matter disclosed herein generally relates to pharmaceutical compositions of spironolactone for the topical administration of the drug to the pilosebaceous unit and methods for administering the same. As disclosed herein, the inventors of the present invention have made the surprising discovery that pharmaceutical compositions comprising small particles of spironolactone suspended in water can be targeted to the pilosebaceous unit after topical administration.

BACKGROUND OF THE INVENTION

Transdermal and topical delivery of drugs have a variety of advantages compared with other routes of administration. Transdermal and topical delivery can be used to deliver drugs continuously into the systemic circulation and circumvent first-pass metabolism. In contrast, there is a significant first-pass effect of the liver that can prematurely metabolize drugs for oral drug delivery. Transdermal and topical delivery also have advantages over intravenous administration, which must be sterile products and can be painful thereby increasing noncompliance by subjects. Transdermal delivery on the other hand can be non-sterile, non-invasive and self-administered.

Traditional drug delivery systems have focused on administration via the transepidermal route of delivery. Andrea C. Lauer et al., Transfollicular Drug Delivery, Pharmaceutical Research 12:2 (1995). The skin consists primarily of four layers: (a) the stratum corneum (nonviable epidermis), (b) viable epidermis, (c) dermis, and (d) subcutaneous tissues. The skin also contains appendages in the form of terminal hairs, which may extend more than 3 mm below the skin surface into the subcutaneous fatty tissue and vellus hair, which is the fine, often unnoticed body hair that extends less than 1 mm into the dermis. The hair follicle, hair shaft, and sebaceous gland, which secrets a lubricating oil matter into the hair follicles, comprise what is known as a pilosebaceous unit. While the stratum corneum has traditionally been viewed as the primary pathway for the penetration of drugs, it is also the main barrier to percutaneous absorption. In the past, researchers have questioned the significance of the pilosebaceous unit in drug delivery.

More recently, however, the potential role of the pilosebaceous unit and alternative mechanisms for the transdermal delivery of drugs have been investigated. Amit Verma et al., Transfollicular drug delivery: current perspectives, Research and Reports in Transdermal Drug Delivery (Apr. 20, 2016). The mammalian hair follicle is a complex, dynamic structure in which unique biochemical and immunological reactions occur. While the pilosebaceous unit may be an acceptable target for drug delivery, there are several challenges to drug delivery to the pilosebaceous unit. One of the challenges relating to drug delivery to the pilosebaceous unit is the need to bypass the stratum corneum, which extends approximately 10-20 µm deep and the upper capillary plexus, which extends approximately 80 µm deep.

There is currently a need for pharmaceutical compositions capable of penetrating deeper into the dermis, approximately 1,000 µm to 2,000 µm to the pilosebaceous unit. There is an unmet need for novel pharmaceutical compositions and methods of administering drugs via the pilosebaceous unit.

SUMMARY OF THE INVENTION

The present invention relates to pharmaceutical compositions of spironolactone for the topical administration of the drug to the pilosebaceous unit and methods for administering the same. The pharmaceutical compositions comprise small particles of spironolactone suspended in water. The inventors of the present invention have surprisingly determined that aqueous suspensions of spironolactone can be targeted to the pilosebaceous unit after topical administration.

In certain embodiments of the present invention, a pharmaceutical composition is provided comprising a therapeutically effective amount of spironolactone or a pharmaceutically acceptable salt thereof and water. The spironolactone can have a primary particle size distribution characterized by a D90 value of less than about 6 µm, less than about 1 µm, or more preferably less than about 0.25 µm. The spironolactone can further have a primary particle size distribution characterized by a D50 value of less than about 2.7 µm, less than about 0.75 µm, or more preferably less than about 0.15 µm. The spironolactone can further have a primary particle size distribution characterized by a D10 value of less than about 1.2 µm, less than about 0.50 µm, or more preferably less than about 0.10 µm.

In certain embodiments, the pharmaceutical composition comprises about 0.10% w/w to about 7.5% w/w of spironolactone or a salt thereof. In certain embodiments, the pharmaceutical composition can comprise from about 0.5% w/w to about 5% w/w of spironolactone or a salt thereof. In certain embodiments, the pharmaceutical composition is an aqueous suspension. In certain embodiments, the pharmaceutical composition further comprises dioctyl sodium sulfosuccinate and/or hydroxyl propyl cellulose. In certain embodiments, the pharmaceutical composition comprises about 0.01% w/w to about 1% w/w of dioctyl sodium sulfosuccinate and/or about 0.01% to about 1.5% w/w of hydroxyl propyl cellulose. In certain embodiments, the pharmaceutical composition is a topical formulation.

In certain embodiments, the pharmaceutical composition is capable of delivering spironolactone to the pilosebaceous unit of a subject. In certain embodiments, the pharmaceutical composition is capable of achieving dermal penetration of at least 1 mm in the subject, and preferably about 2 or 3 mm in the subject.

In certain embodiments of the present invention, a pharmaceutical composition is provided consisting essentially of or consisting of a therapeutically effective amount of spironolactone or a pharmaceutically acceptable salt thereof, dioctyl sodium sulfosuccinate, hydroxyl propyl cellulose, and water. The spironolactone can have a primary particle size distribution characterized by a D90 value of less than about 6 µm, less than about 1 µm, or more preferably less than about 0.25 µm. The spironolactone can further have a primary particle size distribution characterized by a D50 value of less than about 2.7 µm, less than about 0.75 µm, or more preferably less than about 0.15 µm. The spironolactone can further have a primary particle size distribution characterized by a D10 value of less than about 1.2 µm, less than about 0.50 µm, or more preferably less than about 0.10 µm.

In certain embodiments, the pharmaceutical composition comprises about 0.10% w/w to about 7.5% w/w of spironolactone or a salt thereof. In certain embodiments, the pharmaceutical composition can comprise from about 0.5% w/w to about 5% w/w of spironolactone or a salt thereof. In certain embodiments, the pharmaceutical composition is an aqueous suspension. In certain embodiments, the pharmaceutical composition comprises about 0.01% w/w to about 1% w/w of dioctyl sodium sulfosuccinate and about 0.01% to about 1.5% w/w of hydroxyl propyl cellulose.

In certain embodiments, the pharmaceutical composition is capable of delivering spironolactone to the pilosebaceous unit of a subject. In certain embodiments, the pharmaceutical composition is capable of achieving dermal penetration of at least 1 mm in the subject, and preferably about 2 or 3 mm in the subject.

In certain embodiments, the pharmaceutical composition is provided in a package selected from the group consisting of a sachet comprising a towelette or wipe, a pump comprising a spray or foam, a control flow applicator comprising a sponge, a dropper or dropper bottle comprising a suspension.

In certain embodiments of the present invention, a method of treating a skin or hair disorder in a subject in need thereof is provided. In certain embodiments, the skin or hair disorder is acne, alopecia areata, or male pattern baldness. In certain embodiments, the subject is a human male or female. In certain embodiments for treating acne, the subject is a female human. The method comprises topically administering to the subject the pharmaceutical compositions of spironolactone described herein. In the methods of the present invention, the spironolactone or salt thereof can be delivered to the pilosebaceous unit. In the methods disclosed herein, administration of the pharmaceutical composition can result in dermal penetration of spironolactone of at least 1 mm in the subject, and preferably about 2 or 3 mm in the subject.

BRIEF DESCRIPTION OF THE DRAWINGS

The accompanying drawings, which are incorporated herein and form part of the disclosure, help illustrate various embodiments of the present invention and, together with the description, further serve to describe the invention to enable a person skilled in the pertinent art to make and use the embodiments disclosed herein.

DETAILED DESCRIPTION OF THE INVENTION

Figure 1:
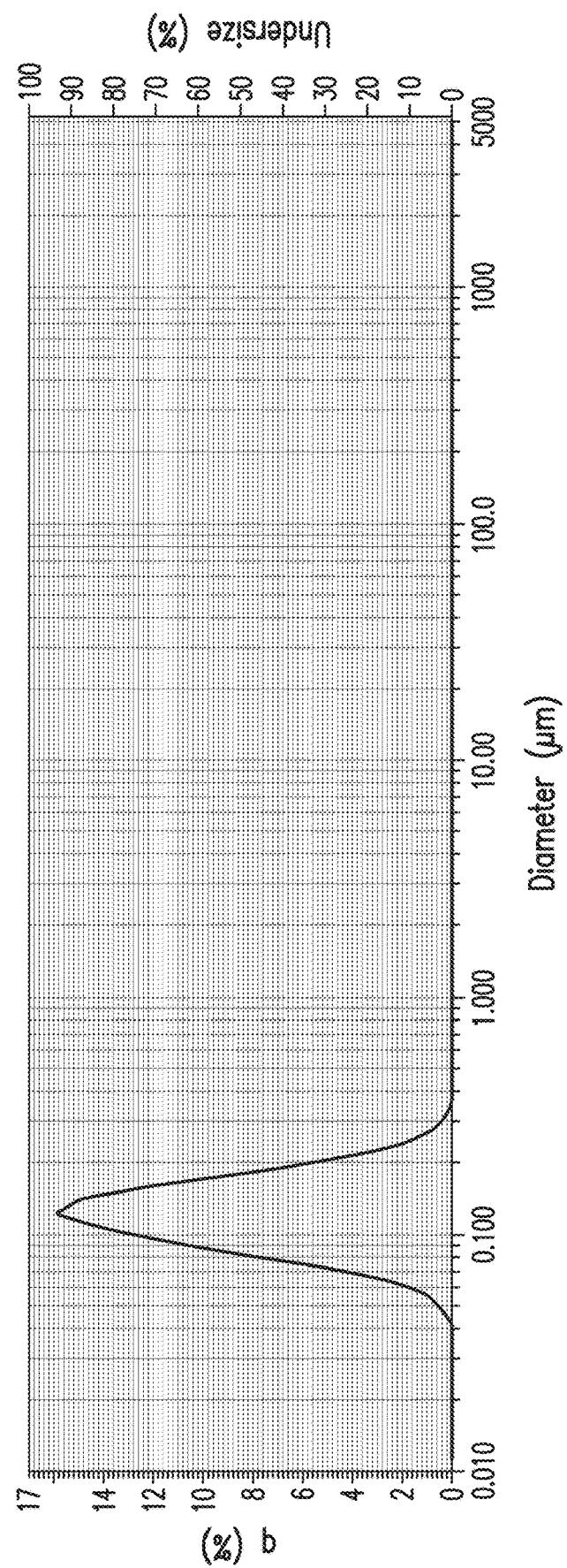
FIG. 1 shows a particle size distribution of spironolactone in a suspension of 5.0% spironolactone nano-milled in water with 0.05% dioctyl sulfosuccinate (DOSS) and 1.0% hydroxyl propyl cellulose.

Before the present invention is described in detail below, it is to be understood that this invention is not limited to the particular methodology, protocols, and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art to which this invention belongs.

All publications, patents and patent applications cited herein are hereby incorporated by reference in their entirety unless otherwise stated. Where the same term is defined in a publication, patent, or patent application and the present disclosure incorporated herein by reference, the definition in the present disclosure represents a controlling definition. For publications, patents and patent applications referenced to describe a particular type of compound, chemistry, etc., the portion relating to such compounds, chemistry, etc. is the portion of the literature incorporated herein by reference.

Note that as used herein, the singular forms "a," "an," and "the" include plural referents unless the context clearly dictates otherwise. Thus, for example, "active ingredient" includes a single ingredient and two or more different ingredients and "sulfate salt" includes a single sulfate salt as well as two or more different sulfate salts.

The term "about" when used in connection with a numerical value is meant to encompass numerical values within a range having a lower limit that is 5% smaller than the indicated numerical value and having an upper limit that is 5% larger than the indicated numerical value.

The term "effective" refers to an amount of a compound, agent, substance, formulation or composition that is of sufficient quantity to result in a decrease in severity of disease symptoms, an increase in frequency and duration of disease symptom-free periods, or a prevention of impairment or disability due to the disease affliction. The amount may be as a single dose or according to a multiple dose regimen, alone or in combination with other compounds, agents or substances. One of ordinary skill in the art would be able to determine such amounts based on such factors as a subject's size, the severity of a subject's symptoms, and the particular composition or route of administration selected.

"Pharmaceutically acceptable" means generally safe for administration to humans or animals. Preferably, a pharmaceutically acceptable component is one that has been approved by a regulatory agency of the Federal or a state government or listed in the U.S. Pharmacopeia, published by the United States Pharmacopeial Convention, Inc., Rockville Md., or other generally recognized pharmacopeia for use in animals, and more particularly in humans.

A "pharmaceutical composition" according to the invention may be present in the form of a composition, wherein the different active ingredients and diluents and/or carriers are admixed with each other, or may take the form of a combined preparation, where the active ingredients are present in partially or totally distinct form. An example for such a combination or combined preparation is a kit-of-parts.

As used herein, the terms "subject" "or patient" most preferably refers to a human being. The terms "subject" or "patient" may include any mammal that may benefit from the compounds described herein.

A "therapeutic amount" or "therapeutically effective amount" is an amount of a therapeutic agent sufficient to achieve the intended purpose. The effective amount of a given therapeutic agent will vary with factors such as the nature of the agent, the route of administration, the size of the subject to receive the therapeutic agent, and the purpose of the administration. The effective amount in each individual case may be determined empirically by a skilled artisan according to established methods in the art.

The term "topical" with respect to administration of a drug or composition refers to the application of such drug or composition to the epithelial surface outside the body, including the skin or cornea. For this application, application to the inside of a body opening in which the mucosal surface does not contain pilosebaceous units, such as the mouth, vagina or rectum is not considered a topical application.

As used herein, "treat," "treating," or "treatment" of a disease or disorder means accomplishing one or more of the following: (a) reducing the severity and/or duration of the disorder; (b) limiting or preventing development of symptoms characteristic of the disorder(s) being treated; (c) inhibiting worsening of symptoms characteristic of the disorder(s) being treated; (d) limiting or preventing recurrence of the disorder(s) in subjects that have previously had the disorder(s); and (e) limiting or preventing recurrence of symptoms in subjects that were previously symptomatic for the disorder(s); and (f) improving symptoms characteristic of or associated with the disorder(s) in subjects.

The abbreviation "w/w" represents the relative concentration of the components in the composition as "weight to weight" (i.e., percentage refers to percentage of total weight), rather than based on volume or other quantities.

The present invention relates to pharmaceutical compositions of spironolactone for the topical administration of the drug to the pilosebaceous unit and methods for administering the same. The pharmaceutical compositions comprise small particles of spironolactone and water. In certain embodiments, the pharmaceutical compositions of the present invention are capable of delivering the active pharmaceutical ingredient to the pilosebaceous unit. In certain embodiments, active pharmaceutical ingredient is capable of achieving dermal penetration of at least 1 mm in the subject.

In certain embodiments of the present invention, the pharmaceutical composition comprises the aldosternone agonist, 17-hydroxy-7α-mercapto-3-oxo-17α-pregn-4-ene-21-carboxylic acid 7-lactone acetate, which is also known as spironolactone. The structure of spironolactone is:

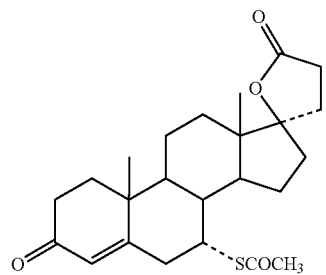

Spironolactone is a drug that acts at the mineralocorticoid receptor level by competitively inhibiting aldosterone binding. This steroidal compound has been used for blocking aldosterone-dependent sodium transport in the distal tubule of the kidney in order to reduce edema and to treat essential hypertension and primary hyperaldosteronism. Orally administrated spironolactone is also efficacious in the treatment of women with acne. E.M. Attwa et al., Efficacy and safety of topical spironolactone 5% gel versus placebo in the treatment of acne vulgaris, J. Dermatol. Venerol. 39:89-94 (2019); J. W. Charny et al., Spironolactone for the treatment of acne in women, a retrospective study of 110 patients, Int. J. Womens Dermatol. 3(2): 111-115 (2017). Spironolactone is commercially available under the tradenames ALDACTONE® and CAROSPIR®. Spironolactone is disclosed in U.S. Pat. No. 3,013,012, which is hereby incorporated by reference.

In the present invention, the pharmaceutical composition is administered topically. The pharmaceutical composition can spironolactone as a free base or a pharmaceutically acceptable salt. Suitable pharmaceutically acceptable salts can be found in Remington's Pharmaceutical Sciences, 17th ed., Mack Publishing Company (1985), which is incorporated by reference herein.

The pharmaceutical can comprise the active ingredient (i.e., spironolactone) as small or submicron particles. Particle size of the drug can be assessed using laser diffraction methods. Laser diffraction is recognized by standards and guidance agencies including ISO and ASTM and is widely used to determine particle size distributions. In conducting the assessment, the sample is passed through a laser beam, which results in laser light scattered at a range of angles. Detectors placed at fixed angles measure the intensity of light scattered at that position. A mathematical model is then applied to generate a particle size distribution. The particle size values reported herein are determined by using a liquid or wet dispersion method.

In particle size determinations, the median value is defined as the value where half of the population resides above this point, and half resides below this point. For particle size distributions the median is called the D50. The D50 is the size that splits the distribution with half above and half below this diameter. The distribution width may also be characterized by citing one, two or three values on the x-axis, typically some combination of the D10, D50, and D90. The D50, the median, has been defined above as the diameter where half of the population lies below this value. Similarly, 90 percent of the distribution lies below the D90, and 10 percent of the population lies below the D10.

In certain embodiments, the pharmaceutical composition comprises spironolactone having a primary particle size distribution characterized by a D90 value of less than about 6 μm, less than about 5 μm, less than about 2 μm, less than about 1 μm, less than about 0.5 μm, less than about 0.25 μm, or more preferably less than about 0.2 µm. In certain embodiments, the spironolactone has a primary particle size characterized by a D90 value of between about 0.001 µm, 0.01 µm, or 0.1 µm and about 0.2 µm, 0.25 µm, 0.5 µm, 1 µm, 2 µm, 5 µm, or 6 µm.

The spironolactone can further have a primary particle size distribution characterized by a D50 value of less than about 2.7 µm, less than about 2.0 µm, less than about 1.0 µm, less than about 0.75 µm, 0.5 µm, less than about 0.25 µm, less than about 0.2 µm, or more preferably less than about 0.15 µm. In certain embodiments, the spironolactone has a primary particle size characterized by a D50 value of between about 0.001 µm, 0.01 µm, or 0.1 µm and about 0.15 µm, 0.2 µm, 0.25 µm, 0.5 µm, 0.75 µm, 1.0 µm, 2.0 µm, or 2.7 µm.

The spironolactone can further have a primary particle size distribution characterized by a D10 value of less than about 1.2 µm, less than about 1.0 µm, less than about 0.5 µm, less than about 0.25 µm, less than about 0.15 µm, less than about 0.10 µm, or more preferably less than about 0.08 µm. In certain embodiments, the spironolactone has a primary particle size characterized by a D10 value of between about 0.0001 µm, 0.001 µm, or 0.01 µm and about 0.10 µm, 0.15 µm, 0.25 µm, 0.5 µm, 1.0 µm, or 1.2 µm.

In certain embodiments, the pharmaceutical composition is a suspension, wherein the active ingredient (i.e., spironolactone) is suspended in water. In certain embodiments, the pharmaceutical composition comprises between about 90% and 99% w/w water. In certain embodiments, the pharmaceutical composition consists essentially of or consists of spironolactone, dioctyl sodium sulfosuccinate, hydroxyl propyl cellulose, and water. In certain embodiments, the pharmaceutical composition does not comprise an additional thickening agent or a preservative.

In certain embodiments, the pharmaceutical composition may be formulated with additional components, including conventionally found in cosmetic and pharmaceutical topical products. In certain embodiments, the additional components comprise no more than 3%, 2%, 1%, or 0.5% w/w of the pharmaceutical composition.

In certain embodiments, the pharmaceutical composition further comprises dioctyl sodium sulfosuccinate. In certain embodiments, the pharmaceutical composition further comprises hydroxyl propyl cellulose. In certain embodiments, the pharmaceutical composition comprises about 0.01% w/w to about 1% w/w of dioctyl sodium sulfosuccinate and/or about 0.01% to about 1.5% w/w of hydroxyl propyl cellulose.

In certain embodiments, the pharmaceutical composition further comprises one or more of hydroxypropylmethyl cellulose (HPMC), Polyvinylpyrrolidone (PVP K30), poloxamers such as Poloxamer 407, and polysorbates such as polysorbate 80. In certain embodiments, the pharmaceutical composition comprises about 0.1% to about 1.5% HPMC. In certain embodiments, the pharmaceutical composition comprises about 0.1% to about 1.5% PVP K30. In certain embodiments, the pharmaceutical composition comprises about 0.1% to about 1.5% Poloxamer 407. In certain embodiments, the pharmaceutical composition comprises about 0.1% to about 1.5% Polysorbate 80. In certain embodiments, the pharmaceutical composition comprises a pharmaceutically acceptable cellulose polymer such as methyl cellulose (MC), ethyl cellulose (EC), hydroxyethyl cellulose (HEC), carboxymethyl cellulose (CMC), sodium carboxymethyl cellulose (NaCMC), and microcrystalline cellulose. In certain embodiments, the pharmaceutical composition comprises about 0.1% to about 1.5% of a cellulose polymer.

Surfactants

In certain embodiments, the pharmaceutical composition may include one or more surfactants or co-surfactants. Surfactants include, but are not limited to short-chain alcohols, alkane diols and triols, alkyl phosphate esters, polyethylene glycols and glycol ethers, polyethylene stearyl ethers, including those sold under the tradenames Brij S2, Brij S20, Brij 721, Brij 38, Brij 52, Brij 56, and Brij W1, pyrrolidine derivatives, bile salts, sorbitan fatty acid esters and polyoxyethylene sorbitan fatty acid esters. In preferred embodiments, the surfactant is dioctyl sodium sulfosuccinate.

Polymers and Thickeners

In certain embodiments, the pharmaceutical composition may include insoluble organic polymeric thickeners such as natural and synthetic polymers or inorganic thickeners such as acrylates copolymer, carbomer 1382, carbomer copolymer type B, carbomer homopolymer type A, carbomer homopolymer type B, carbomer homopolymer type C, acrylamide/sodium acryloyldimethyl taurate copolymer, carboxy vinyl copolymer, carboxymethylcellulose, carboxypolymethylene, carrageenan, guar gum, xanthan gum, hydroxyethyl cellulose, hydroxypropyl cellulose, microcrystalline wax, and methylcellulose.

Additional Components

In certain embodiments, the pharmaceutical composition may include additional components such as carriers and excipients conventionally found in cosmetic and pharmaceutical topical products. Additional components including but not limited to antioxidants (e.g., BHT, BHA, ascorbic acid, tocopherol, citric acid, propyl gallate, sodium metabisulfite), sequestering agents, stabilizers, buffers, pH adjusting agents (preferably agents which result in an acidic pH, including but not limited to gluconolatone, citric acid, lactic acid, and alpha hydroxyacids), skin penetration enhancers, skin protectants (including but not limited to petrolatum, paraffin wax, dimethicone, glyceryl monoisostearate, isopropyl isostearate, isostearyl isostearate, cetyl alcohol, potassium cetyl phosphate, cetyl behenate and behenic acid), chelating agents, suspending agents (e.g., xanthan gum), dyes, pigments, diluents, fragrances, and other excipients to improve the stability or aesthetics, may be added to the composition.

Administration and Dosage

The present invention further provides methods of treatment involving the administration of one of the pharmaceutical compositions described herein. The methods of treatment can be used to treat a subject suffering from a disorder known to be treated by spironolactone. In certain embodiments, the method is for treating a subject suffering from a skin or hair disorder selected from the group consisting of acne, alopecia (including alopecia areata and androgenic alopecia), male pattern baldness, hirsutisum, rosacea, and combinations thereof. The methods involve topically administering a therapeutically effective amount of the spironolactone pharmaceutical compositions described herein to the subject.

In certain embodiments, the present invention provides methods of treating acne in a subject in need thereof. The methods can include treating acne in a subject in need thereof by administering to the subject the compositions of sprinolactone described herein. Acne is a disorder of the pilosebaceous units located on the face, chest and back. The acne can be one selected from the group consisting of acne, acne vulgaris, inflammatory acne, non-inflammatory acne, acne fulminans, nodular papulopustular acne, acne conglobata, acne rosacea, rosacea, acne excoriee, adult-onset acne, persistent-recurrent acne past teenaged years, and acne associated with other disorders. In certain embodiments, the subject is a human male or female subject. In preferred embodiments, the subject is a human female. Further, the subject can be: (a) experiencing acne flares that cycle with menstruation; (b) inflicted with adult onset acne or persistent-recurrent acne past teenage years, even in the absence of clinical or laboratory signs of hyperandrogenism, (c) on oral contraceptives and exhibiting moderate to severe acne, especially with a hormonal pattern clinically; or (d) not responding to conventional therapy and who are not candidates for oral isotretinoin therapy.

In certain embodiments, the present invention provides methods of treating alopecia in a subject in need thereof. The methods can include treating alopecia in a subject in need thereof by administering to the subject the compositions of spironolactone described herein. The alopecia can be any form of alopecia including alopecia areata or androgenic alopecia. In the context of alopecia areata, treating the disorder includes restoring or preventing hair loss.

In certain embodiments, the present invention provides methods of treating male pattern baldness in a subject in need thereof. The methods can include treating male pattern baldness in a subject in need thereof by administering to the subject the compositions of spironolactone described herein.

In the above described embodiments, the methods for treating a subject in need thereof, comprise topically applying a therapeutically effective amount of the spironolactone pharmaceutical compositions described herein to the subject. In certain embodiments, the active ingredient, spironolactone, can be administered in a therapeutically effective amount. In certain embodiments, the amount of spironolactone can range from about 0.01% w/w to about 10% w/w, or from about 0.01% w/w to about 7.5% w/w, or from about 0.01% w/w to about 5% w/w, or from about 0.1% w/w to about 3% w/w. Exemplary ranges are from about 0.1% w/w to about 10% w/w, or from about 0.1% w/w to about 7.5% w/w, or from about 0.1% w/w to about 5% w/w, or from about 0.1% w/w to about 3% w/w, or from about 1.0% w/w to about 5.0% w/w, or from about 0.3% w/w to about 5.0% w/w. For example, the topical formulation comprises any of the following w/w percents of spironolactone: 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 7%, 1.8%, 1.9%, 1.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, etc.

In certain embodiments, the pharmaceutical composition is administered topically as a regimen, such as at regular intervals. For example, a topical pharmaceutical composition can be administered once daily, twice daily, thrice daily, once per week, twice per week, three times per week, or four times per week. The pharmaceutical compositions can be administered for a prescribed period of time. For example, a topical pharmaceutical composition can be administered for a period of about two weeks to at least about six months, or until an improvement in skin condition or disease is visually observed. Exemplary periods of time for the treatment regimen include two weeks, one month, six weeks, two months, three months, four months, five months, six months, seven months, eight months, nine months, or one year. In preferred embodiments, the topical pharmaceutical composition is administered twice or thrice daily for a period of at least 3 months, 4 months, 5 months, or 6 months.

Package Comprising Pharmaceutical Composition

The spironolactone pharmaceutical compositions described herein can be formulated in a form suitable for topical application to the skin, including for example, an aerosol, dropper, gel, patch, pump spray, applicator, towelette or wipe. The present invention further provides a package comprising one of the pharmaceutical compositions described herein. The package can be sourced in a variety of colors, materials, and sizes as would be understood by a person of ordinary skill in the art to best suit the target application.

In certain embodiments, the package is a sachet comprising a towelette or wipe comprising one of the spironolactone pharmaceutical compositions described herein. In certain embodiments, the wipe or towelette is about 20 to 40 square inches, about 25 to 35 square inches, or about 30 square inches. In certain embodiments, the towelette or wipe is about 5 inches by 6 inches. In certain embodiments, the towelette or wipe comprises about 6 to 8 mL of a spironolactone composition, about 6 to 7.5 mL, about 6.5 to 7.5 mL of a spironolactone composition, or about 7 mL of a spironolactone composition. In certain embodiments the towelette or wipe comprises about 0.2 to 0.4 mL, about 0.2 to about 0.3 mL, or about 0.25 mL of spironolactone composition per square inch of the towellete or wipe.

In certain embodiments, the package is a mechanical pump comprising a foam or spray comprising one of the spironolactone compositions described herein. In certain embodiments, the pump is a polyethylene terephthalate mechanical pump comprising a spironolactone foam. In certain embodiments, the pump is a sprayer pump comprising a clear glass or plastic bottle with a mist sprayer comprising a spironolactone suspension.

In certain embodiments, the package is a dropper or bottle dropper comprising one of the spironolactone compositions described herein. In certain embodiments, the bottle is a low-density polyethylene ("LDPE") bottle with a dropper tip.

In certain embodiments, the package comprises a control flow applicator comprising a sponge comprising one of the spironolactone compositions described herein. The control flow applicator can be any control flow applicator known in the art, including for examples those manufactured by Dab-O-Matic®. The control flow applicator can include a variety of coverings or caps, including those made with white nylon or polyethylene covering, over a neoprene sponge. In certain embodiments, the polyethylene covering allows for moderate flow and allows larger particles to be dispensed without clogging the applicator head. The springs can be made with either a high-density or low-density polyethylene material to alter the amount of product that is dispensed.

The following examples illustrate certain embodiments of the invention without limitation.

EXAMPLES

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Example 1

A 50 mg/mL aqueous suspension of 5% spironolactone containing 0.5% dioctyl sodium sulfosuccinate and 1% hydroxyl propyl cellulose was successfully nano-milled to provide stable submicron particles of suspension of drug particles after storage for 2 weeks at 5° C. and ambient light. The spironolactone had a particle size distribution as set forth in FIG. 1. A Horiba Laser Scattering Particle Size Distribution Analyzer Model LA-950 was used to determine the volume based distribution profile of spironolactone. Circulation, agitation, and ultrasound were all turned off and the instrument was set to manual iteration mode.

Example 2

Figure 2:
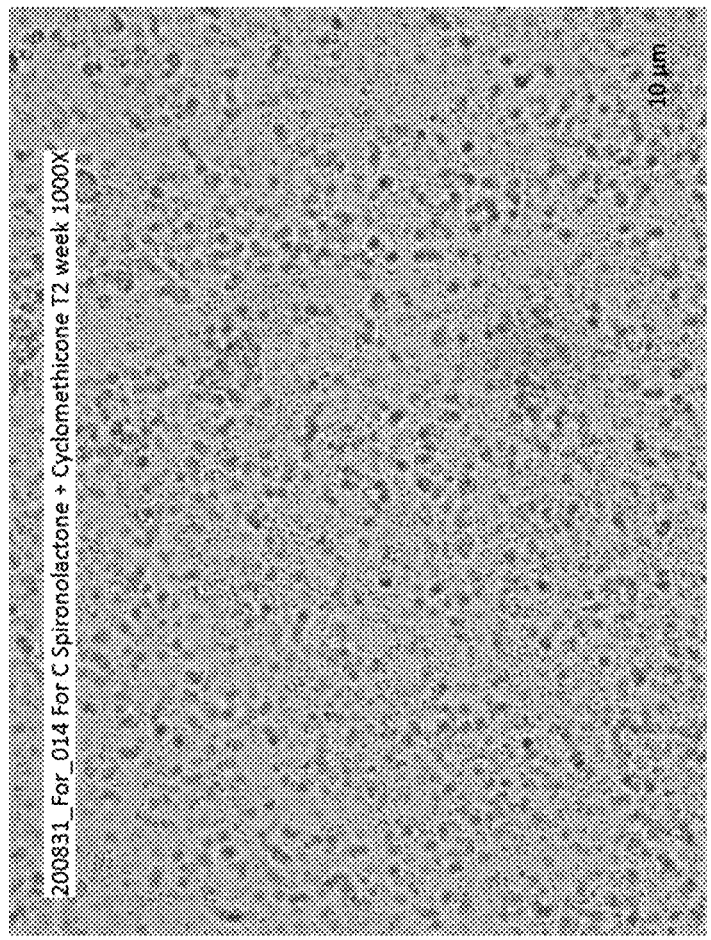
FIG. 2 is a micrograph taken two weeks after storage past completion of milling for a 5% spironolactone suspension in cyclomethicone that was roller milled to form a suspension having a D90 of less than about 5 µm.
Figure 3:
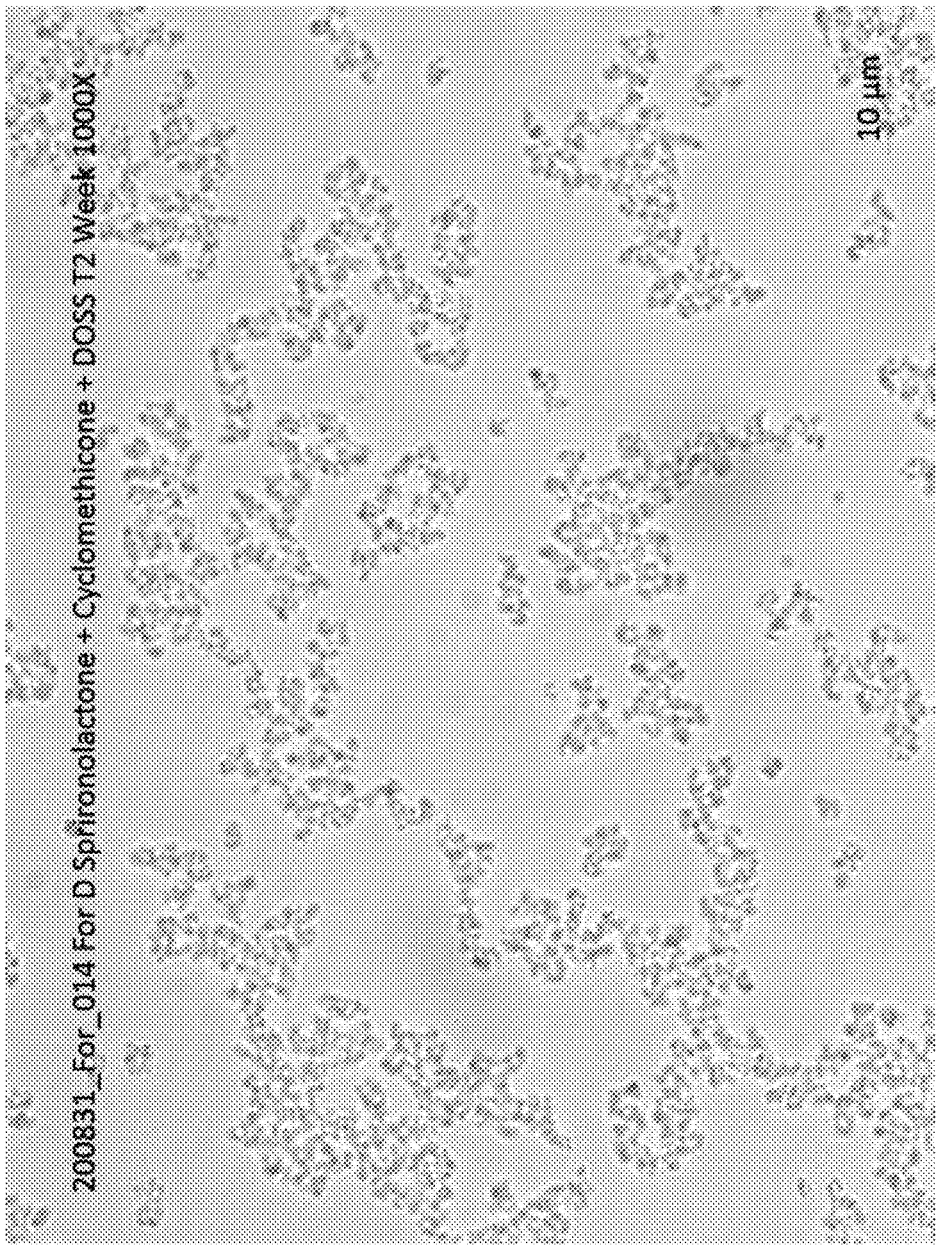
FIG. 3 is a micrograph taken two weeks after storage past completion of milling for a 5% spironolactone suspension in a 94.5:0.5 wt:wt blend of cyclomethicone and dioctyl sodium sulfosuccinate that was roller milled to form a suspension having a D90 of less than about 5 µm.

A 5.0%-5.5% spironolactone suspension in water containing 0.05%-0.055% dioctyl sodium sulfosuccinate and 1.0-1.1% hydroxyl propyl cellulose was nano-milled to achieve the particle size distribution shown in FIG. 1. The composition of the finished product suspension is listed in Table 1 as Formulation 1. An emulsion was formed by mixing the excipients disclosed in Table 1 as Emulsion 1. SEPINEO™ P 600 is a thickening, emulsifying and stabilizing polymer Acrylamide/Sodium Acryloyldimethyl Taurate Copolymer/Isohexadecane & Polysorbate 80 distributed by Seppic Inc., Fairfield N.J. Table 1 lists the final composition of Emulsion 1 in which the cyclomethicone oil phase was a 5% spironolactone suspension in cyclomethicone was roller milled to form a suspension having a D90 of less than about 5 μm as shown in FIG. 2 (microphotograph taken after 2 weeks of storage past completion of milling). Table 1 also lists the final composition of Emulsion 2 in which the cyclomethicone oil phase was 5% spironolactone suspension in a 94.5:0.5 wt:wt blend of cyclomethicone and dioctyl sodium sulfosuccinate that was roller milled to form a suspension having a D90 of less than about 5 μm as shown in FIG. 3 (microphotograph taken after 2 weeks of storage past completion of milling). A comparative gel formulation described in the literature was prepared and is listed in Table 1 as Comparative Gel. (Attwa E M, Ibrahim A M, Abd El-Halim M F, Mahmoud H M, Efficacy and safety of topical spironolactone 5% gel versus placebo in the treatment of acne vulgaris, Egypt J Dermatol Venerol (2019); 39:89-94.)

TABLE 1

Composition of Deep Dermal Drug Delivery Formulations and a Comparative Gel from the Literature.

| Ingredient | Formulation 1 (% w/w) | Emulsion 1 (% w/w) | Emulsion 2 (% w/w) | Comparative Gel (% w/w) |
|---|---|---|---|---|
| Spironolactone | 5.0-5.5 | 4.8 | 4.8 | 5.0 |
| Ethanol | — | — | — | 20.0 |
| Glycerin | — | — | — | 10.0 |
| Propylene glycol | — | — | — | 10.0 |
| Lactic acid | — | — | — | 5.0 |
| Methyl cellulose | — | — | — | 3.0 |
| Sodium benzoate | — | — | — | 0.03 |
| Cylclomethicone | — | 9.5 | 9.45 | — |
| Dioctyl sodium sulfosuccinate | 0.05-0.055 | 0.043 | 0.048 | — |
| Hydroxyl propyl cellulose | 1.0-1.1 | 0.86 | 0.86 | — |
| Sepineo P600 | — | 4.0 | 4.0 | — |
| Water | q.s. ad 100% | q.s. ad 100% | q.s. ad 100% | 46.97 |

In vitro skin penetration testing (IVPT) was used to determine how rapidly the different formulations crossed excised human skin. Human cadaver skin was procured from two donors (Caucasian female age=48 abdomen skin dermatomed to an average thickness of 580 μm and Hispanic male age=50 abdomen skin dermatomed to an average thickness of 910 μm). Dermatomed skin was received frozen from a US tissue bank and stored at −20° C. until use. Skin was loaded onto vertical Franz cells having a 0.503 $cm^2$ (8 mm in diameter) diffusion area and a receptor chamber filled with 3.0 ml of 4% BSA in water containing 0.01% gentamicin sulfate thermostated at 32° C. Using a positive displacement pipette, 5 microliters of each formulation was dosed on each Franz Cell (10 mg per square centimeter of skin). Receptor solutions were analyzed using a validated LC-MS/MS (Kinetex C18, 5 μm, 2.1×50 mm column, Shimadzu LC20ADXR pumps and AB Sciex API 4000 Turbo Spray detector). The cumulative amount of spironolactone assayed in the receptor solution is the average of four replicate IVPT measurements.

To determine the levels of spironolactone retained in the epidermis and dermis 24-hours after dosing the skin, the skin surface was cleaned of any unabsorbed and unpenetrated spironolactone. This was accomplished by wiping the tissue surface with a Q-tip wetted with 1×PBS three times followed by two tape strippings. The epidermis (including the stratum corneum) was removed from the dermis and soaked in 4.0 ml of a DMSO/Acetonitrile (ACN) (50/50 v/v) mixture for overnight at room temperature using an orbit shaker. The remaining dermis layer was cut into small pieces and extracted with 4.0 ml of the DMSO/ACN mixture for overnight at room temperature using an orbit shaker. Extracts of the dermis and epidermis were analyzed using a validated LC-MS/MS (Kinetex C18, 5 μm, 2.1×50 mm column, Shimadzu LC20ADXR pumps and AB Sciex API 4000 Turbo Spray detector).

Figure 4:
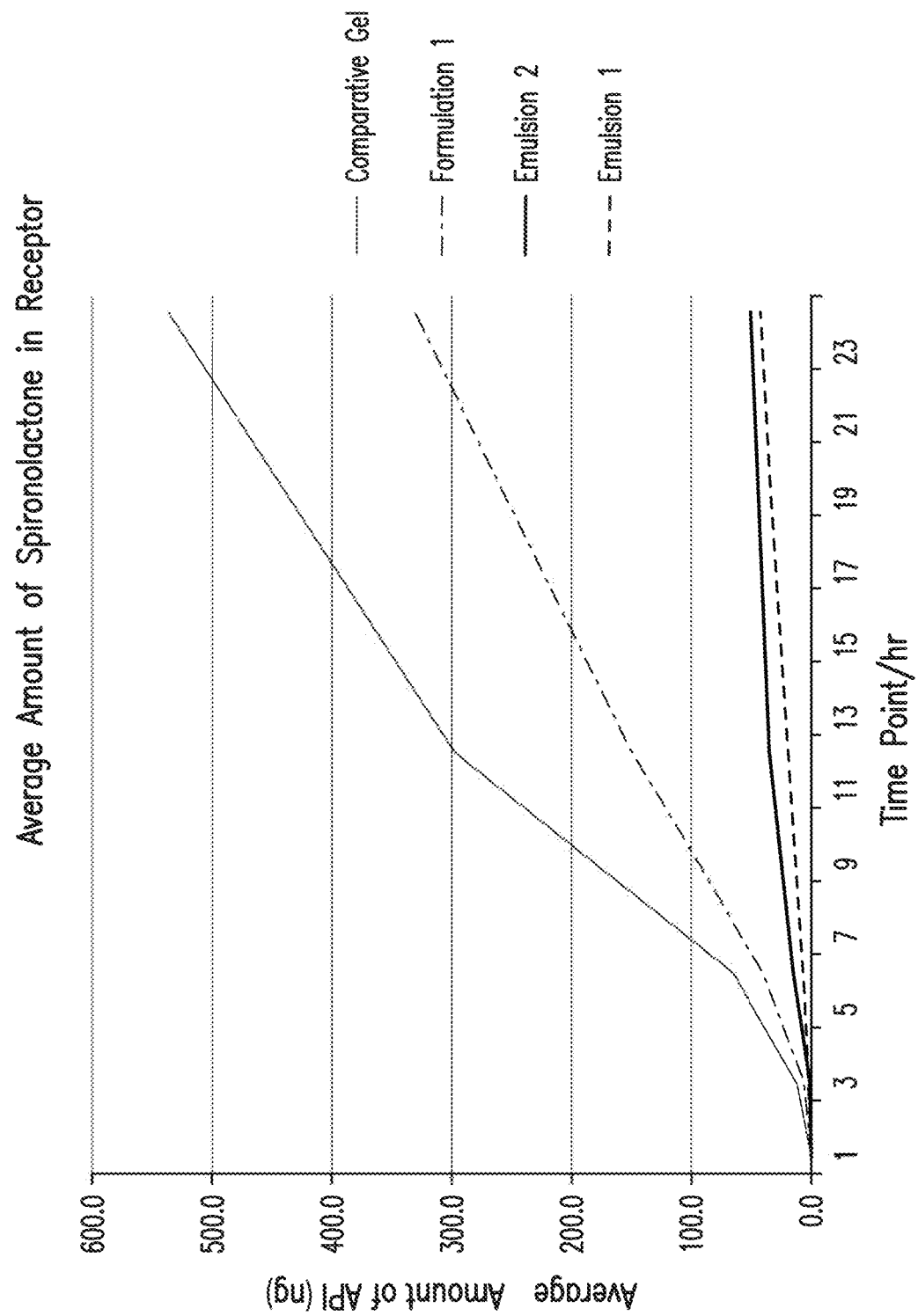
FIG. 4 shows the cumulative amount of spironolactone appearing in the receptor solution over 24 hours after a single 5.0 µl per cell (10 mg per cm² of skin tissue) for an exemplary aqueous suspension formulation (Formulation 1), Emulsion 1, Emulsion 2, and a Comparative Gel formulation (as described in further detail in Example 2).
Figure 5:
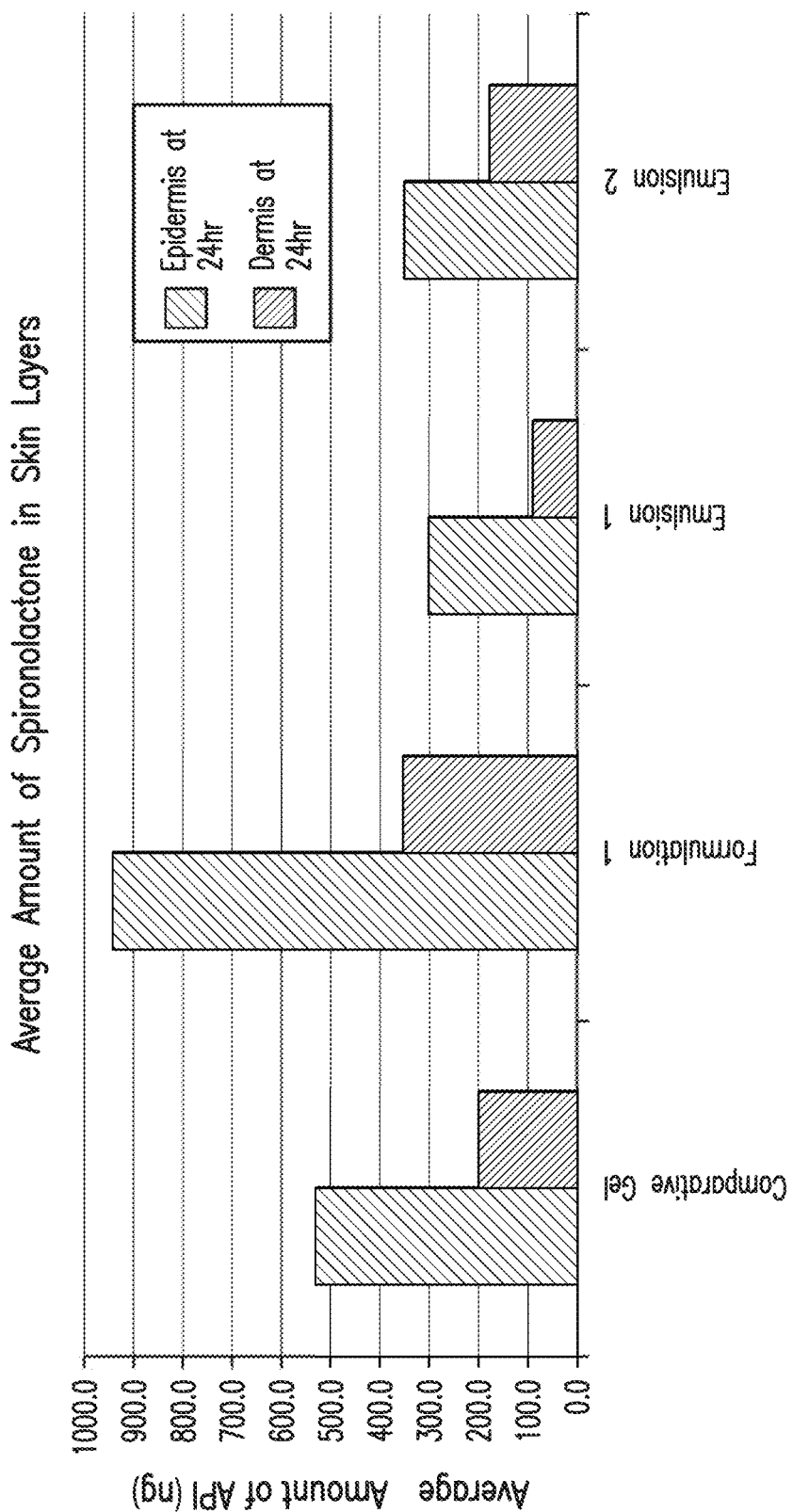
FIG. 5 shows the amount of spironolactone (ng) in the epidermis and dermis after 24 hours for the exemplary aqueous suspension formulation (Formulation 1), Emulsion 1, Emulsion 2, and a Comparative Gel formulation (as described in Example 2).

FIG. 4 illustrates the cumulative amount of spironolactone appearing in the receptor solution over 24 hours after a single 5.0 μl per cell (10 mg per $cm^2$ of skin tissue) for Formulation 1, Emulsion 1, Emulsion 2, and the Comparative Gel. In FIG. 4, each plotted value is the average of four separate pieces of excised human skin. FIG. 5 illustrates the amount of spironolactone (ng) in the epidermis and dermis after 24 hours for Formulation 1, Emulsion 1, Emulsion 2, and the Comparative Gel. As seen in FIG. 5 the comparative gel with 5% dissolved spironolactone delivered more spironolactone across excised human skin than the 5% spironolactone water suspension or either of the two emulsion formulations. However, significantly greater deposition of spironolactone into the epidermis (location of the infundibulum of the pilosebaceous unit) for the aqueous suspension is seen in FIG. 5 compared to the comparative gel having dissolved spironolactone or the silicone oil emulsions having submicron particles of suspended spironolactone. High levels of API in the epidermis and dermis indicates that spironolactone targets the pilosebaceous unit and has significantly greater follicular deposition from the aqueous suspension (D90<0.5 µm which is Formulation 1).

Example 3

A 5.0%-5.5% spironolactone suspension in water containing 0.05%-0.055% dioctyl sodium sulfosuccinate and 1.0-1.1% hydroxyl propyl cellulose was nano-milled to achieve the particle size distribution shown in FIG. 1. To this aqueous suspension different preservatives, thickening agents and ethanol were added to this aqueous suspension as shown in Table 2. Seven different formulations (S1-S7) were prepared as set forth in Table 2.

TABLE 2

Composition of the Comparative Spironolactone (S) Aqueous Suspension Formulations.

| Formulation Components | S-1 (% w/w) | S-2 (% w/w) | S-3 (% w/w) | S-4 (% w/w) | S-5 (% w/w) | S-6 (% w/w) | S-7 (% w/w) |
|---|---|---|---|---|---|---|---|
| Spironolactone | 4.98 | 4.94 | 4.94 | 4.90 | 4.89 | 5.00 | 4.93 |
| Methylparaben | 0.10 | 0.10 | 0.10 | — | 0.10 | — | 0.10 |
| Propylparaben | 0.01 | 0.01 | 0.01 | — | 0.01 | — | 0.01 |
| Phenoxyethanol | — | — | — | 1.00 | — | — | — |
| Benzyl Alcohol | — | — | — | — | — | 1.00 | — |
| Ethanol | — | — | — | — | — | 10.00 | — |
| Polysorbate 80 | — | — | — | — | 1.00 | — | — |
| Poloxamer 407 | — | — | — | — | — | — | 0.20 |
| Carbopol 974 | 0.30 | — | — | — | — | — | — |
| Hydroxypropyl cellulose | — | 1.00 | — | 1.00 | 1.00 | 1.00 | 1.00 |
| Hyaluronic Acid | — | — | 1.00 | — | — | — | — |
| Water containing 0.05-0.055% dioctyl sodium sulfosuccinate and 1.0-1.1% hydroxyl propyl cellulose | q.s. ad 100% | q.s. ad 100% | q.s. ad 100% | q.s. ad 100% | q.s. ad 100% | q.s. ad 100% | q.s. ad 100% |

In vitro skin penetration testing (IVPT) was used to determine how rapidly the different formulations crossed excised human skin. Human cadaver skin was procured from two donors (Caucasian female age=44 abdomen skin dermatomed to an average thickness of 710 µm and Caucasian female age=48 abdomen skin dermatomed to an average thickness of 578 µm). Dermatomed skin was received frozen from a US tissue bank and stored at −20° C. until use. Skin was loaded onto vertical Franz cells having a 0.503 cm$^2$ (8 mm in diameter) diffusion area and a receptor chamber filled with 3.0 ml of 4% BSA in water containing 0.01% gentamicin sulfate thermostated at 32° C. Using a positive displacement pipette, 5 microliters of each formulation was dosed on each Franz Cell (10 mg per square centimeter of skin). Receptor solutions were analyzed using a validated LC-MS/MS (Kinetex C18, 5 µm, 2.1×50 mm column, Shimadzu LC20ADXR pumps and AB Sciex API 4000 Turbo Spray detector). The cumulative amount of spironolactone assayed in the receptor solution is the average of four replicate IVPT measurements.

To determine the levels of spironolactone retained in the epidermis and dermis 24-hours after dosing the skin, the skin surface was cleaned of any unabsorbed and unpenetrated spironolactone. This was accomplished by wiping the tissue surface with a Q-tip wetted with 1×PBS three times followed by two tape strippings. The epidermis (including the stratum corneum) was removed from the dermis and soaked in 4.0 ml of a DMSO/Acetonitrile (ACN) (50/50 v/v) mixture for overnight at room temperature using an orbit shaker. The remaining dermis layer was cut into small pieces and extracted with 4.0 ml of the DMSO/ACN mixture for overnight at room temperature using an orbit shaker. Extracts of the dermis and epidermis were analyzed using a validated LC-MS/MS (Kinetex C18, 5 µm, 2.1×50 mm column, Shimadzu LC20ADXR pumps and AB Sciex API 4000 Turbo Spray detector).

Figure 6:
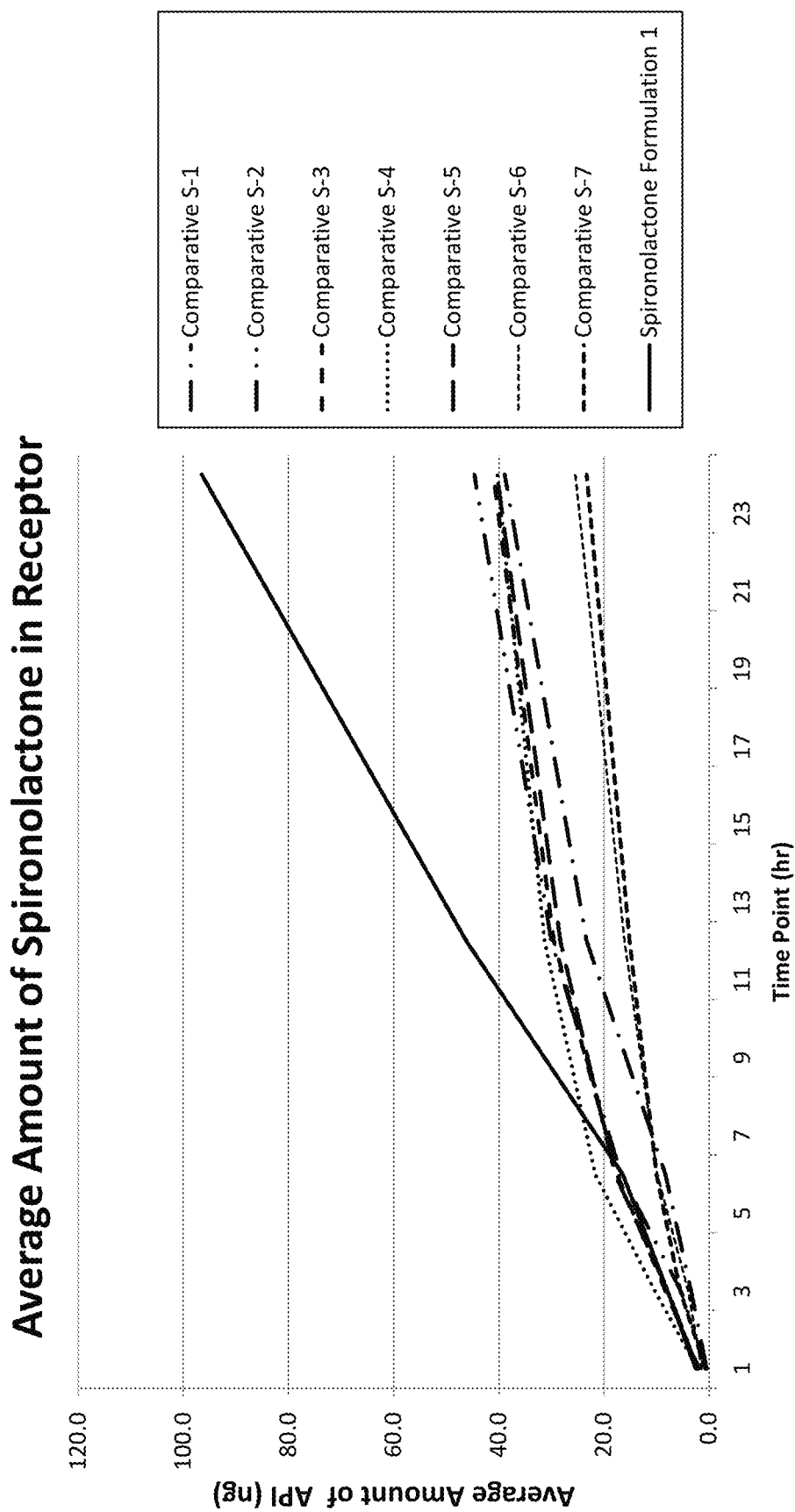
FIG. 6 shows the average amount of spironolactone appearing in the receptor solution over 24 hours after a single 5.0 µl per cell (10 mg per cm² of skin tissue) for eight exemplary formulations (S1-57, described in Example 3, and Formulation 1, described in Example 2).
Figure 7:
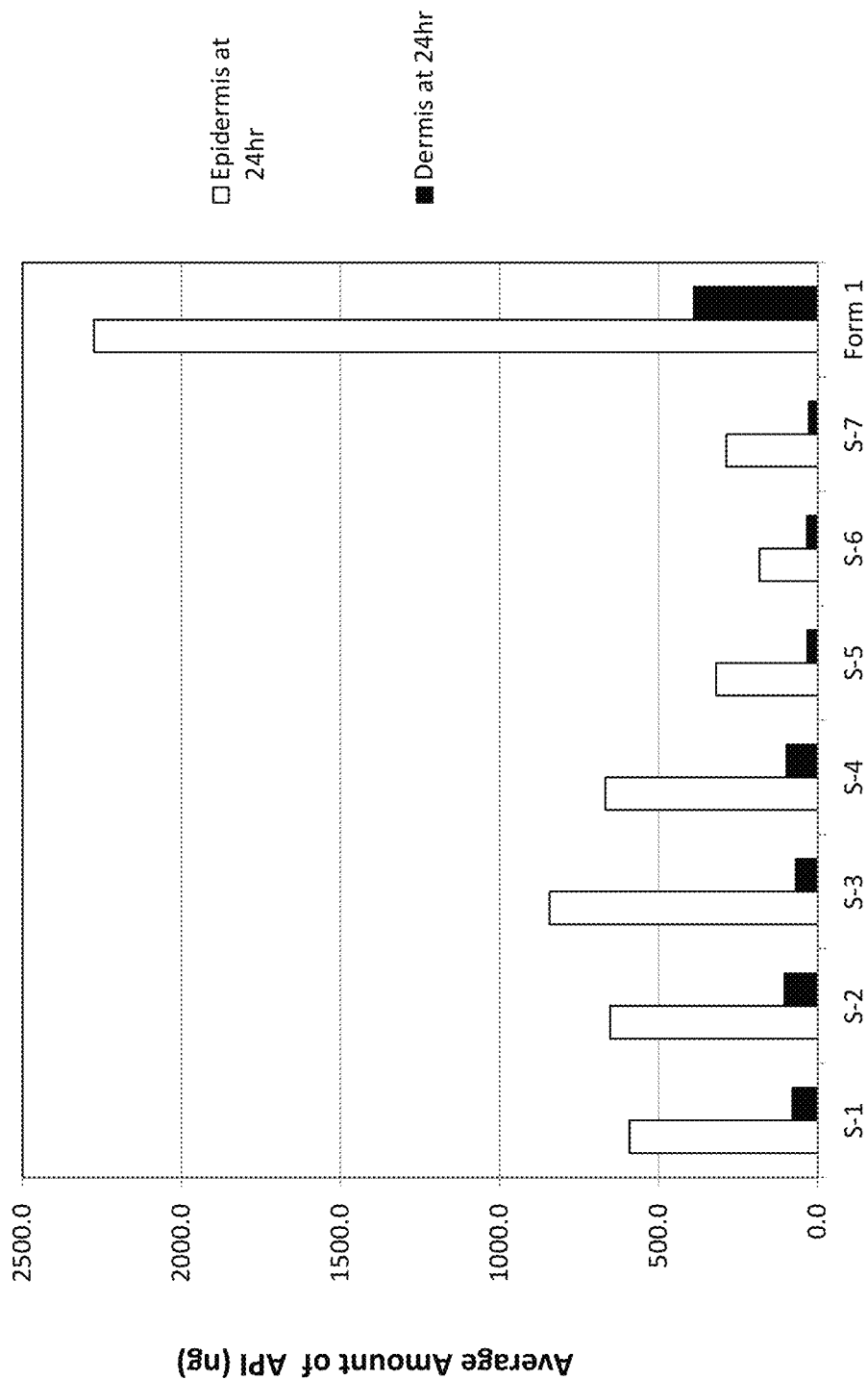
FIG. 7 shows the amount of spironolactone (ng) in the epidermis and dermis after 24 hours for eight exemplary formulations (S1-57, described in Example 3, and Formulation 1, described in Example 2).

FIG. 6 illustrates the average amount of spironolactone appearing in the receptor solution over 24 hours after a single 5.0 µl per cell (10 mg per cm$^2$ of skin tissue) for S1-S7 and Formulation 1 (as described in Example 2). In FIG. 6, each plotted value is the average of four separate pieces of excised human skin. FIG. 6 illustrates the amount of spironolactone (ng) in the epidermis and dermis after 24 hours for S1-S7 and Formulation 1 (as described in Example 4). FIG. 7 shows that there was significantly greater deposition of spironolactone in the epidermis and dermis after topical dosing with an aqueous suspension (Formulation 1) compared with the seven other formulations (S1-S7) having the same particle size distribution set forth in FIG. 1. The data indicates that even minor modifications of adding a preservative or gelling agent inactivates the ability of suspended spironolactone to target the pilosebaceous unit.

Example 4

Sachets comprising wipes of spironolactone suspension were prepared. Individual wipes and sachets were cut from two different brands of bulk rolls of product packaging (Packaging Type "A" and "B"). Sachets were formed by heat sealing three edges of a paper (outside)/foil (inside) laminate roll stock. Packaging Type A formed a 2 in. by 3.75 in. sachet, while Packaging Type B formed a 2.5 in. by 3 in. sachet. The wipes, measuring 5 in. by 6 in., were folded 5.5 times accordion style, then folded in half and inserted into the corresponding sachet and heat sealing the final edge of the package.

A batch of a 5.49% spironolactone nano-sized suspension in water containing 0.055% dioctyl sodium sulfosuccinate, 1.1% hydroxyl propyl cellulose, 0.10%, methyl paraben, and 0.01% propyl paraben was compounded. The 5 in. by 6 in. wipes were dosed with either 3.9 mL or 7.8 mL of the spironolactone suspension, the sachets were sealed, and the finished units were stored at controlled room temperature ("CRT") for no less than ("NLT") two days before testing. The wipes were submitted for assay to determine the quantity of spironolactone that could be successfully retrieved from the wipe by testing the fluid wrung directly from the wipe compared to the assay value of the 5.49% suspension dosed on the towelette. Two wipes dosed with 3.9 mL of spironolactone suspension from Packaging Type A and B and two wipes dosed with 7.8 mL of spironolactone suspension from Packaging Type A were wrung by hand, with the resulting liquid being assayed for spironolactone content.

As seen in Table 3, some of the water penetrates the fibers of the non-woven towelette material and deposits spironolactone on the surface of the towelette. Since wringing out the dosed towelette does not completely "dry out" the non-woven material, not all of the water from inside the fibers is recovered during wringing out the towelette. Since excess water is not adsorbed into the fibers, insufficient water is wrung out of the fibers to completely dislodge all the drug particles adhered to the surface of the non-woven material. This results in approximately 80% of the suspended spironolactone being recovered from the wrung out towelette when 3.9 mL of 5.49% spironolactone is dosed onto the towelette in the single-use sachet packaging. However, when 7.8 mL of spironolactone nano-sized suspension is dosed onto the towelette, sufficient water is adsorbed into the non-woven fibers to force surface adhered drug particles off the towelette and into the wrung out product that is analogous to the drug product applied to the skin of the subject. While neither a dosing volume of 3.9 mL or 7.8 mL is optimal for the topical spironolactone towelette product (ideally the % of spironolactone recovered will be in the range of 95% to 105%), Example 4 demonstrated that an optimized dosing volume will be around 7 mL and that a dosing volume of 3.9 mL for a 5 in. by 6 in. is insufficient to recover 100% of spironolactone.

TABLE 3

Spironolactone Content of Wrung Single Dose Wipes.

| Batch No. | Control Sample Preserved Spironolactone Nanosuspension (% w/w) | Sample Description | Concentration (% w/w) | % of Preserved Suspension |
|---|---|---|---|---|
| 2020-058-81 | 2.50 | Packaging Type A Dosed with 3.9 mL of Material | 2.00 | 80.0 |
| | | | 2.07 | 82.9 |
| | | Packaging Type B Dosed with 3.9 mL of Material | 2.16 | 86.5 |
| | | | 2.35 | 94.2 |
| | | Packaging Type A Dosed with 7.8 mL of Material | 2.59 | 103.9 |
| | | | 2.70 | 108.3 |

Example 5

A clear polyethylene terephthalate (PET) foaming pump comprising a spironolactone suspension was prepared. A batch of a 4.94% (w/w) spironolactone nano-sized suspension in water containing 0.055% diocytl sodium sulfosuccinate, 1.1% hydroxyl propyl cellulose, 1.00% Poloxamer 407, 0.10% methyl paraben, and 0.01% propyl paraben was compounded. The batch was filled into a clear, mechanical, polyethylene terephthalate (PET) foaming pump. Samples of the product prior to dispensation were taken before and after shaking to resuspend the API. After shaking was performed, several pumps of product were dispensed into a weigh boat, which was tared on a four decimal balance and added directly to a volumetric flask. The amount of product added to the flask was determined by the difference in weight. All three samples were assayed to determine the API concentration. The results are set forth in Table 4. Based on these results, the API concentration of the dispensed product was not adversely impacted when dispensed from a mechanical foaming pump, however, the unit must be shaken prior to dispensing to ensure that the API is evenly dispersed.

TABLE 4

Spironolactone Content of Dispensed Drug Product, Mechanical Foam Pump.

| Target Level (% w/w) | Sample Description | Concentration (% w/w) | % of Target Level |
|---|---|---|---|
| 4.94 | Prior to Dispensation; Prior to Mixing | 4.1785 | 84.6 |
| | Prior to Dispensation; Following Mixing | 5.1426 | 104.1 |
| | Following Dispensation; Following Mixing | 5.2671 | 106.6 |

Example 6

A control flow applicator with a white nylon cover over a neoprene sponge and a low dose spring manufactured by Dab-O-Matic® comprising a spironolactone suspension was prepared. A batch of a 4.99% (w/w) spironolactone nano-sized suspension in water containing 0.055% diocytl sodium sulfosuccinate, 1.1% hydroxyl propyl cellulose, 0.10% methyl paraben, and 0.01% propyl paraben was compounded. The batch was filled into a 40 mL high-density polyethylene ("HDPE") bottle and capped with an applicator head with the spring removed from the apparatus. The bottle was shaken prior to dispensing and secured to a ring stand with a three-pronged adjustable clamp. A glass beaker was placed underneath the applicator head to collect the dispensed product. The adjustable clamp was tightened to act as a vice on the bottle and the dispensed product was collected.

Samples of both the original batch and the dispensed product were submitted for assay testing to determine if the sponge and covering on the applicator head have negative impact on the spironolactone concentration of the dispensed product. The results are set forth in Table 5. Based on the results, the API concentration of the dispensed product was not adversely impacted when dispensed through the control flow applicator head.

TABLE 5

Spironolactone Content of Dispensed Drug Product, Control Flow Applicator.

| Target Level (% w/w) | Sample Description | Concentration (% w/w) | % of Target Level |
|---|---|---|---|
| 4.99 | Prior to Dispensation | 4.9971 | 100.1 |
| | Following Dispensation | 5.1404 | 103.0 |

Example 7

A low-density polyethylene ("LDPE") 1 oz. round bottle dropper with a LDPE controlled dropper tip comprising a spironolactone suspension was prepared. A batch of a 5.5% (w/w) spironolactone nano-sized suspension in water comprising 0.055% dioctyl sodium sulfosuccinate and 1.1% hydroxyl propyl cellulose was filled into a dropper bottle. A dropper tip was securely fastened to the neck of the bottle. Prior to dispensation, the bottle was shaken for not less than 10 seconds to ensure that the API was adequately suspended. 3.5 g of sample was dispensed directly into a glass vial. A separate sample of the original batch was filled into another glass vial concurrently to represent the API concentration of the batch prior to dispensation.

The samples taken prior to and following dispensation were submitted for assay testing to determine if the controlled dropper tip has a negative impact on the spironolactone concentration of the dispensed product. The results are set forth in Table 6. Based on these results, the API concentration of the dispensed product was not adversely impacted when dispensed through this type of dropper bottle closure.

TABLE 6

Spironolactone Content of Dispersed Drug Product, Dropper Bottle.

| Concentration (% w/w) Prior to dispensation | Concentration (% w/w) Following dispensation | % of Original Batch |
|---|---|---|
| 4.61 | 4.63 | 100.4 |
|  | 4.60 | 99.8 |

Example 8

A clear glass 1 oz. round bottle with a plastic fine mist sprayer with 0.14 cc output comprising a spironolactone suspension was prepared. A batch of a 5.5% (w/w) spironolactone nano-sized suspension in water comprising 0.055% dioctyl sodium sulfosuccinate and 1.1% hydroxyl propyl cellulose was filled into the glass bottle. A plastic pump sprayer was screwed onto the bottle. Prior to dispensation, the bottle was shaken for not less than 10 seconds to ensure that the API was adequately suspended. 3.5 g of sample was dispensed directly into a glass vial. A separate sample of the original batch was filled into another glass vial concurrently to represent the API concentration of the batch prior to dispensation.

The samples taken prior to and following dispensation were submitted for assay testing to determine if the pump sprayer has a negative impact on the spironolactone concentration of the dispensed product. The results are set forth in Table 7. Based on these results, the API concentration of the dispensed product was not adversely impacted when dispensed through this type of pump sprayer.

TABLE 7

Spironolactone Content of Dispersed Drug Product, Pump Sprayer.

| Concentration (% w/w) Prior to dispensation | Concentration (% w/w) Following dispensation | % of Original Batch |
|---|---|---|
| 4.61 | 4.59 | 99.6 |
|  | 4.55 | 98.7 |

The foregoing description has been presented for purposes of illustration and description. This description is not intended to limit the invention to the precise form disclosed. Persons of ordinary skill in the art will appreciate that modifications and substitutions of the basic inventive description may be made.

What is claimed is:

1. A topical pharmaceutical composition comprising:
a therapeutically effective amount of about 0.10% w/w to about 7.5% w/w of spironolactone or a pharmaceutically acceptable salt thereof, wherein a primary particle size distribution of the spironolactone is characterized by a D90 value of less than about 0.25 µm; and
water,
wherein the spironolactone is suspended in water.

2. The pharmaceutical composition of claim 1, wherein the composition further comprises dioctyl sodium sulfosuccinate.

3. The pharmaceutical composition of claim 2, wherein the composition further comprises hydroxyl propyl cellulose.

4. A package comprising the pharmaceutical composition of claim 1, wherein the package is selected from the group consisting of a sachet comprising a towelette or wipe, a pump comprising a spray or foam, a control flow applicator comprising a sponge, or a dropper or dropper bottle comprising a suspension.

5. The method of claim 1, wherein the composition does not comprise a preservative.

6. A topical pharmaceutical composition consisting essentially of:
a therapeutically effective amount of about 0.10% w/w to about 7.5% w/w of spironolactone or a pharmaceutically acceptable salt thereof, wherein a primary particle size distribution of the spironolactone is characterized by a D90 value of less than about 0.25 µm;
dioctyl sodium sulfosuccinate;
hydroxyl propyl cellulose; and
water,
wherein the spironolactone is suspended in water.

7. The pharmaceutical composition of claim 6, wherein the composition comprises about 0.01% w/w to about 1% w/w of dioctyl sodium sulfosuccinate; and about 0.01% to about 1.5% w/w of hydroxyl propyl cellulose.

8. A package comprising the pharmaceutical composition of claim 6, wherein the package is selected from the group consisting of a sachet comprising a towelette or wipe, a pump comprising a spray or foam, a control flow applicator comprising a sponge, or a dropper or dropper bottle comprising a suspension.

9. The method of claim 6, wherein the composition does not comprise a preservative.

10. A method of treating a hair or skin condition in a subject in need thereof comprising:
topically administering to the subject a pharmaceutical composition comprising: (a) a therapeutically effective amount of about 0.10% w/w to about 7.5% w/w of spironolactone or a pharmaceutically acceptable salt thereof, wherein a primary particle size distribution of the spironolactone is characterized by a D90 value of less than about 0.25 um; and (b) water, and wherein the hair or skin condition is selected from the group consisting of acne, alopecia areata, or male pattern baldness, wherein the spironolactone is suspended in water.

11. The method of claim 10, wherein the composition further comprises dioctyl sodium sulfosuccinate.

12. The method of claim 11, wherein the composition further comprises hydroxyl propyl cellulose.

13. The method of claim 10, wherein the composition does not comprise a preservative.

* * * * *